UNITED STATES PATENT OFFICE.

ANUAL DUKE, OF MARION, INDIANA.

PROCESS OF PRESERVING EGGS AND PRODUCT THEREOF.

1,261,724.     Specification of Letters Patent.     Patented Apr. 2, 1918.

No Drawing.     Application filed January 23, 1917. Serial No. 144,010.

*To all whom it may concern:*

Be it known that I, ANUAL DUKE, a citizen of the United States, residing at Marion, in the county of Grant and State of Indiana, have invented new and useful Improvements in Processes of Preserving Eggs and Product Thereof, of which the following is a specification.

The present invention relates to a process of preserving eggs by coating the same with a material whereby the egg can be kept for a long period of time without deterioration.

I am aware that various compositions for this purpose have heretofore been suggested, most of which are open to certain objections, which are overcome by the use of the particular material employed in the present invention. The process of the present invention is also much simpler than many of the processes heretofore employed, and has been found to preserve the eggs for long periods.

In carrying out my invention I coat the freshly laid eggs with the unadulterated albumen or white of egg. This liquid is applied to the surface of the egg shell in any convenient manner, for example by means of a soft rag or sponge, or by dipping the eggs into the liquid, after which the eggs are allowed to dry and can then be packed into ordinary egg cases and will retain their freshness for a long time. The white of egg, after drying forms a coating of a glutinous nature, which closes the pores of the shell and excludes action of the air, and ferments carried thereby, thereby securely sealing the egg, and possesses the added advantage that nothing is added to the egg except normal constituents of eggs, and accordingly cannot be objected to by the pure food laws of any of the States.

In handling eggs, preparatory to shipping the same, there are always more or less eggs broken, the whites of which can be employed for coating the unbroken eggs, the white of one egg being amply sufficient to coat about two dozen ordinary eggs.

What I claim is:

1. A process of preserving eggs which comprises coating the shells with a solution of albumen, and allowing the same to dry.

2. A process of preserving eggs which comprises coating the shells with white of egg, and allowing the same to dry.

3. A coated egg free from constituents other than those of a normal egg.

4. An egg coated with a dried film of white of egg.

In testimony whereof I affix my signature.

ANUAL DUKE.